United States Patent
Wright et al.

(10) Patent No.: US 6,754,725 B1
(45) Date of Patent: Jun. 22, 2004

(54) USB PERIPHERAL CONTAINING ITS OWN DEVICE DRIVER

(75) Inventors: David G. Wright, Woodinville, WA (US); Frederick D. Jaccard, Woodinville, WA (US)

(73) Assignee: Cypress Semiconductor Corp., San Jose, CA (US)

( * ) Notice: Subject to any disclaimer, the term of this patent is extended or adjusted under 35 U.S.C. 154(b) by 380 days.

(21) Appl. No.: 09/850,468

(22) Filed: May 7, 2001

(51) Int. Cl.[7] .............................................. G06F 13/00
(52) U.S. Cl. .............................. 710/8; 710/10; 710/19; 710/36; 710/41; 710/62; 710/63; 710/64
(58) Field of Search ................................ 710/8, 10, 19, 710/36, 41, 62, 63, 64

(56) References Cited

U.S. PATENT DOCUMENTS

| | | | |
|---|---|---|---|
| 4,641,261 A | 2/1987 | Dwyer et al. ................ 364/900 |
| 4,862,355 A | 8/1989 | Newman et al. ............ 364/200 |
| 5,289,580 A | 2/1994 | Latif et al. ................... 395/275 |
| 5,428,748 A | 6/1995 | Davidson et al. ........... 395/275 |
| 5,488,657 A | 1/1996 | Lynn et al. .................. 379/395 |
| 5,553,245 A | * 9/1996 | Su et al. ...................... 710/104 |
| 5,574,859 A | 11/1996 | Yeh ........................ 395/200.01 |
| 5,577,213 A | 11/1996 | Avery et al. ................. 395/280 |
| 5,586,268 A | 12/1996 | Chen et al. .................. 395/250 |
| 5,598,409 A | 1/1997 | Madonna et al. ........... 370/364 |
| 5,606,672 A | 2/1997 | Wade ........................... 395/308 |
| 5,615,344 A | 3/1997 | Corder ........................ 395/309 |
| 5,634,074 A | 5/1997 | Devon et al. ................ 395/828 |
| 5,671,355 A | 9/1997 | Collins ........................ 709/250 |
| 5,673,031 A | 9/1997 | Meier .................... 340/825.08 |
| 5,687,346 A | 11/1997 | Shinohara ................... 711/130 |
| 5,701,429 A | 12/1997 | Legvold et al. ............. 711/114 |
| 5,794,032 A | * 8/1998 | Leyda ............................ 713/2 |
| 5,794,033 A | 8/1998 | Aldebert et al. ............ 713/100 |
| 5,802,558 A | 9/1998 | Pierce ......................... 711/115 |
| 5,838,907 A | 11/1998 | Hansen ........................ 709/220 |
| 6,012,103 A | * 1/2000 | Sartore et al. ................. 710/8 |
| 6,038,667 A | 3/2000 | Helbig, Sr. ................. 713/200 |
| 6,148,346 A | * 11/2000 | Hanson ........................ 709/321 |
| 6,249,825 B1 | 6/2001 | Sartore et al. ................. 710/8 |
| 6,460,094 B1 | * 10/2002 | Hanson et al. ................ 710/8 |

OTHER PUBLICATIONS

"http://www.silicom.co.il/news/201100usb.htm", Silicom Ltd. Connectivity Solutions, pp. 1–3.
"http://www.silicom.co.il/news/130801u2es.htm", Silicom Ltd. Connectivity Solutions, pp. 1–3.

* cited by examiner

*Primary Examiner*—Jeffrey Gaffin
*Assistant Examiner*—Mohammad D. Farooq
(74) *Attorney, Agent, or Firm*—Christopher P. Maiorana, P.C.

(57) ABSTRACT

A peripheral device comprising a computer readable media and an interface circuit. The computer readable media may be configured to store instructions for operating the peripheral device. The interface circuit may be configured to communicate the instructions to an operating system of a computer in response to connection of the peripheral device to the computer.

23 Claims, 5 Drawing Sheets

United States Patent US 6,754,725 B1

USB PERIPHERAL CONTAINING ITS OWN DEVICE DRIVER

FIELD OF THE INVENTION

The present invention relates to a system and method for connecting a computer system to a peripheral device generally and, more particularly, to a system and/or method for interfacing a computer system to a Universal Serial Bus (USB) peripheral device.

BACKGROUND OF THE INVENTION

A computer system can be connected to a plurality of peripheral devices, such as a printer, a keyboard and a mouse. A Universal Serial Bus (USB) can be used to connect the peripheral devices to the computer system. The USB provides an easy and reliable connection to the peripheral devices by using a standardized connector and form factor. The USB can also make operating the peripheral devices with the computer easier and more reliable than using various different types of communication ports. The computer to which the peripheral devices are connected by the USB is known as the "host computer". The USB replaces multiple cable and connector types with a single standardized connection system. The USB also permits the connection and disconnection of USB compatible peripheral devices while the computer is turned on.

When a peripheral device is first connected to the USB, the host computer detects the presence of the connected peripheral device and a configuration process (e.g., enumeration) begins. The enumeration process assigns a unique USB address to the connected peripheral device, queries the connected peripheral device about requirements and capabilities, writes data about the connected peripheral device into the operating system (OS) of the host computer and loads the appropriate software device driver from a storage location into the operating system. The device driver is a program that allows the OS to communicate correctly with the peripheral device and provides information to the computer operating system about the peripheral device.

A number of standard device drivers can be an integral part of the operating system. Operating systems (e.g., Windows Me, Windows 2000, trademarks of Microsoft, and versions of MacOS, a trademark of Apple Computer), can have a "class" driver that supports any "mass storage" device complying with the requirements of the USB Mass Storage Class Specification. Conventionally, USB peripherals whose functionality does not fall into one of the categories defined in one of the various USB class specifications are shipped with a floppy disk or CD-ROM containing the device drivers.

When the location of the appropriate software driver is not known to the operating system, the operating system can query the user for the location of the driver (e.g., drive name and directory) and load the appropriate software device driver from a storage location specified. Upon completion of the enumeration process, the connected peripheral device is recognized by the operating system and may be used by application software being executed by the host computer.

Providing the device drivers on a floppy disk or CD-ROM adds to the cost of the peripheral. After initial installation, the end user can misplace or damage the original media on which the drivers are stored, resulting in difficulty when installing the peripheral device on a different computer in the future. The floppy disk or CD-ROM can place physical constraints on the size and form factor of packaging in which the USB peripheral is supplied. The constraints on size and form factor can (i) increase shipping cost during distribution (e.g., land and sea freight is charged by volume), (ii) affect the effectiveness of the marketing function of the package (e.g., reduce the attractiveness of its appearance) and (iii) affect the location in a retail outlet where the product can be sold (e.g. shelf vs hanging rack) which may in turn affect the margins demanded by the distributor and/or the retailer.

Because airfreight may add significantly to media cost and media duplication is frequently not cheapest in the immediate locality of low cost electronics manufacturing, media duplication can take as much as 2 months when transportation time is taken into account. Economies of scale can lead to the purchase of larger volumes of media than are required for a single manufacturing batch of a peripheral. The purchase of large volumes of media can result in capital being tied up in inventory. In addition, because any change or improvement in the peripheral device that results in a change to the device driver(s) can require the manufacture of new media, the purchase of a large volume of media can reduce opportunities for innovation or quality improvement in the product. Thus, any change in device drivers can involve up to the 2 months lead time to implement, and possibly a costly write-off of obsolete media inventory.

SUMMARY OF THE INVENTION

The present invention concerns a peripheral device comprising a computer readable media and an interface circuit. The computer readable media may be configured to store instructions for operating the peripheral device. The interface circuit may be configured to communicate the instructions to an operating system of a computer in response to connection of the peripheral device to the computer.

The objects, features and advantages of the present invention include providing a method and/or architecture for USB peripheral devices to provide device drivers to an operating system that may (i) eliminate need for floppy disk or CD-ROM, (ii) reduce capital tied up in inventory, (iii) eliminate inventory write-off when device driver are upgraded, (iv) reduced shipping and packaging costs, (v) eliminate problem of lost or damaged media, (vi) make device driver available whenever device is connected, (vii) reduced physical constraints on the size and form factor of the packaging in which a USB peripheral is supplied, (viii) increase the industrial design options open to the packaging designer, and/or (ix) reduce inventory resulting in faster time to market by removing a potentially long lead time component.

BRIEF DESCRIPTION OF THE INVENTION

These and other objects, features and advantages of the present invention will be apparent from the following detailed description and the appended claims and drawings in which:

DETAILED DESCRIPTION OF THE PREFERRED EMBODIMENT

Figure 1:
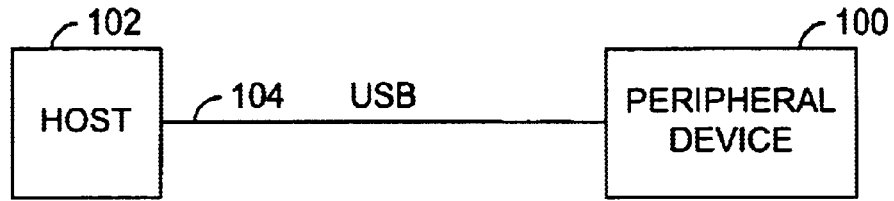
FIG. 1 is a block diagram of an exemplary implementation of the present invention.

Referring to FIG. 1, a block diagram of a peripheral device 100 is shown in accordance with a preferred embodiment of the present invention. The device 100 may be connected to a host system 102 via a communication bus 104. In one example, the device 100 may be implemented as a Universal Serial Bus (USB) device and the communication bus 104 may be implemented as a serial bus. The device 100 and the bus 104 may be compliant with the USB specification version 1.0 (published November 1996), the USB specification version 1.1 (published September 1998) and/or the USB specification 2.0 (published April 2000), each of which is hereby incorporated by reference in its entirety. The peripheral device 100 may be configured to store one or more device drivers and transfer the drivers to an operating system of the host 102 as needed. The drivers may be stored in the peripheral device 100 in compressed form. Other files associated with the peripheral device 100 may also be loaded from the peripheral device 100 in a similar manner.

Figure 2:
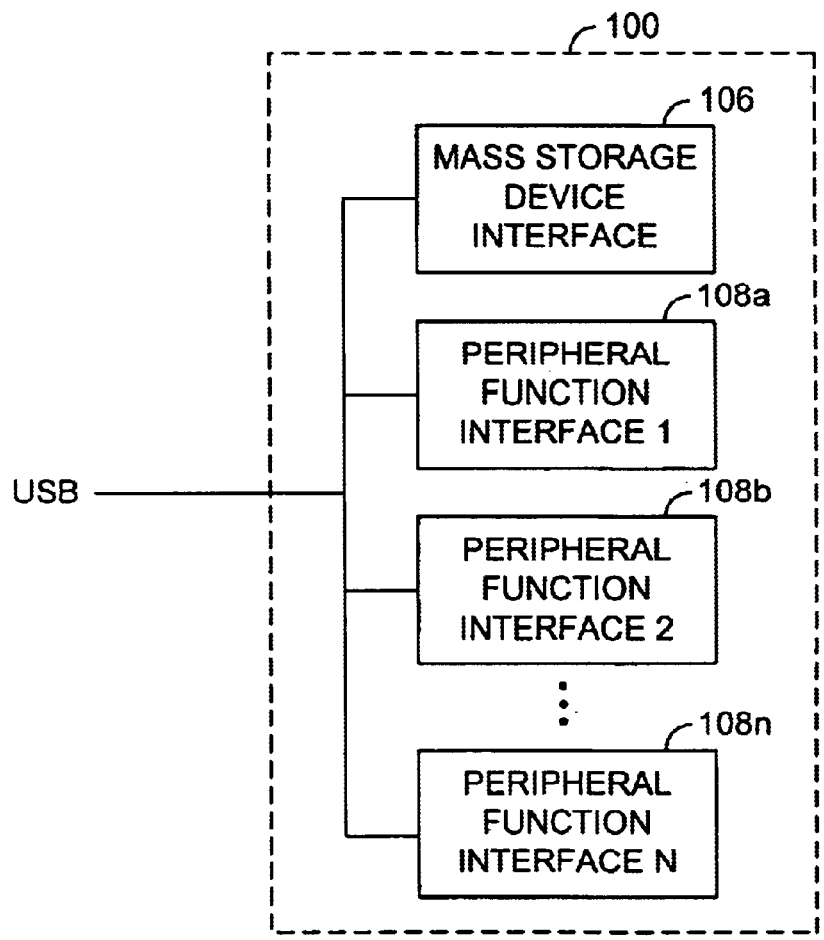
FIG. 2 is a block diagram of a preferred embodiment of the present invention.

Referring to FIG. 2, a block diagram of the device 100 illustrating a preferred embodiment of the present invention is shown. The device 100 may be configured to implement a mass storage interface 106. The mass storage interface 106 may be implemented in addition to other function interfaces 108a–108n implemented by the device 100. The mass storage interface 106 (and the interfaces 108a–108n) may be compliant with the USB specification version 1.0 (published November 1996), the USB specification version 1.1 (published September 1998) and/or the USB specification 2.0 (published April 2000), each of which is hereby incorporated by reference in its entirety. The device 100 may be configured such that the mass storage interface 106 is always activated (e.g., enumerated) first. For example, the device 100 may be configured to first transfer descriptor information for the mass storage interface 106 and then descriptor information for any other interfaces implemented.

Figure 3:
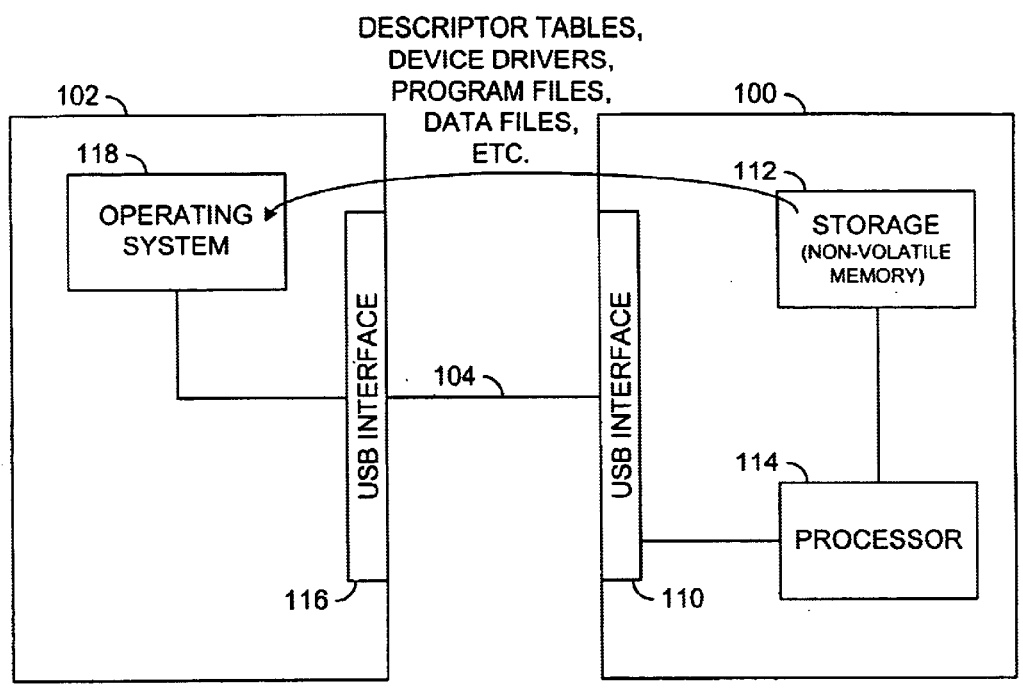
FIG. 3 is a more detailed block diagram of a preferred embodiment of the present invention.

Referring to FIG. 3, a more detailed block diagram of the device 100 is shown. The device 100 may comprise an interface circuit 110, a storage circuit 112, and a processor 114. The interface circuit 110 may be implemented as a USB compliant interface circuit. The storage circuit 112 may be implemented, in one example, as a non-volatile memory (e.g. Flash, EEPROM, etc.). However, other types of memory may be implemented accordingly to meet the design criteria of a particular application. The processor 114 may be implemented as a microprocessor, a microcontroller, a digital signal processor (DSP), an application specific integrated circuit (ASIC), a programmable logic circuit (PLD, CPLD, FPGA, etc.) or other appropriate processor or digital logic circuit for meeting the design criteria of a particular application.

The circuit 110 and the circuit 112 may be coupled via the circuit 114. The circuit 110 may be connected to the circuit 114 by, in one example, a data bus and a control bus. The circuit 112 may be connected to the circuit 114 by, in one example, a data bus, an address bus, and a control bus. However, other types and/or numbers of connections between the circuits 110, 112, and 114 may be implemented accordingly to meet the design criteria of a particular application. For example, the circuit 112 may be connected to the circuit 114 by a serial connection.

An interface circuit 116 may be used to connect the host 102 to the USB 104. The interface circuit 116 may be implemented as a USB compliant interface circuit. The host 102 may have an operating system 118 (e.g., WINDOWS, LINUX, MacOS, etc.) that may be configured to manage communications between the host 102 and the device 100 via the interface 116.

When the device 100 is initially attached to the host 102, the device 100 may be configured such that the mass storage interface 106 is recognized by the host 102 before the main functions 108a–108n of the device 100 are recognized. The configuration of the device 100 may include ordering of a number of "descriptors" reported by the device 100 to the host 102.

The operating system 118 will generally try to locate an appropriate device driver(s) for the main functions of the device 100. When the operating system 118 is unable to locate a device driver for the device 100, the operating system 118 may ask the user for the location of the driver. The user may direct the operating system 118 to a "virtual" disk represented by the mass storage interface 106. In response to the mass storage interface 106 being specified as the location of the driver, the operating system 118 will generally load the driver from the peripheral device 100 via the bus 104.

In general, any device complying with the USB mass storage class specification, or having any one "interface" complying with the specification may appear to the host as incorporating a "mass storage" capability. For example, the device 100 may appear to be a disk drive that the host may recognize without any requirement for vendor-supplied device drivers (e.g., the device drivers may be an integral part of the operating system).

USB devices may have many different "interfaces" (e.g., a single peripheral may appear to the host to be a collection of several different functions). The device 100 may appear as having one more interface than may be used by the actual peripheral function(s). The additional interface may be the mass storage interface 106. Examples of multiple-interface devices that may benefit from the present invention may include but are not limited to: (i) a printer/scanner/fax machine, where each of the functions may be implemented having a separate interface; (ii) a keyboard or mouse with a fingerprint scanner incorporated, where the keyboard or mouse function may use a human interface device (HID) class driver while the fingerprint sensor may use a custom driver; and (iii) a keyboard with a smart card reader incorporated. Single-interface devices may also benefit from the present invention. Examples of single-interface devices that may benefit from the present invention may include but are not limited to USB network adapters, scanners, printers, DSL or cable modems, and cell phones (e.g., enumerating a USB interface to allow operation as a modem).

The device 100 may be implemented as a composite device (e.g., multiple functions treated by the operating system as multiple "virtual" devices on the same "twig" of the USB "tree"). However, in an alternative implementation, the device 100 may be implemented as a compound device (e.g., a hub with one or more embedded functions, where the mass storage interface 106 and the other interfaces 108a–108n are each separate "virtual twigs", each independently connected to "the next branch up" in the "USB tree" by the hub).

Figure 4:
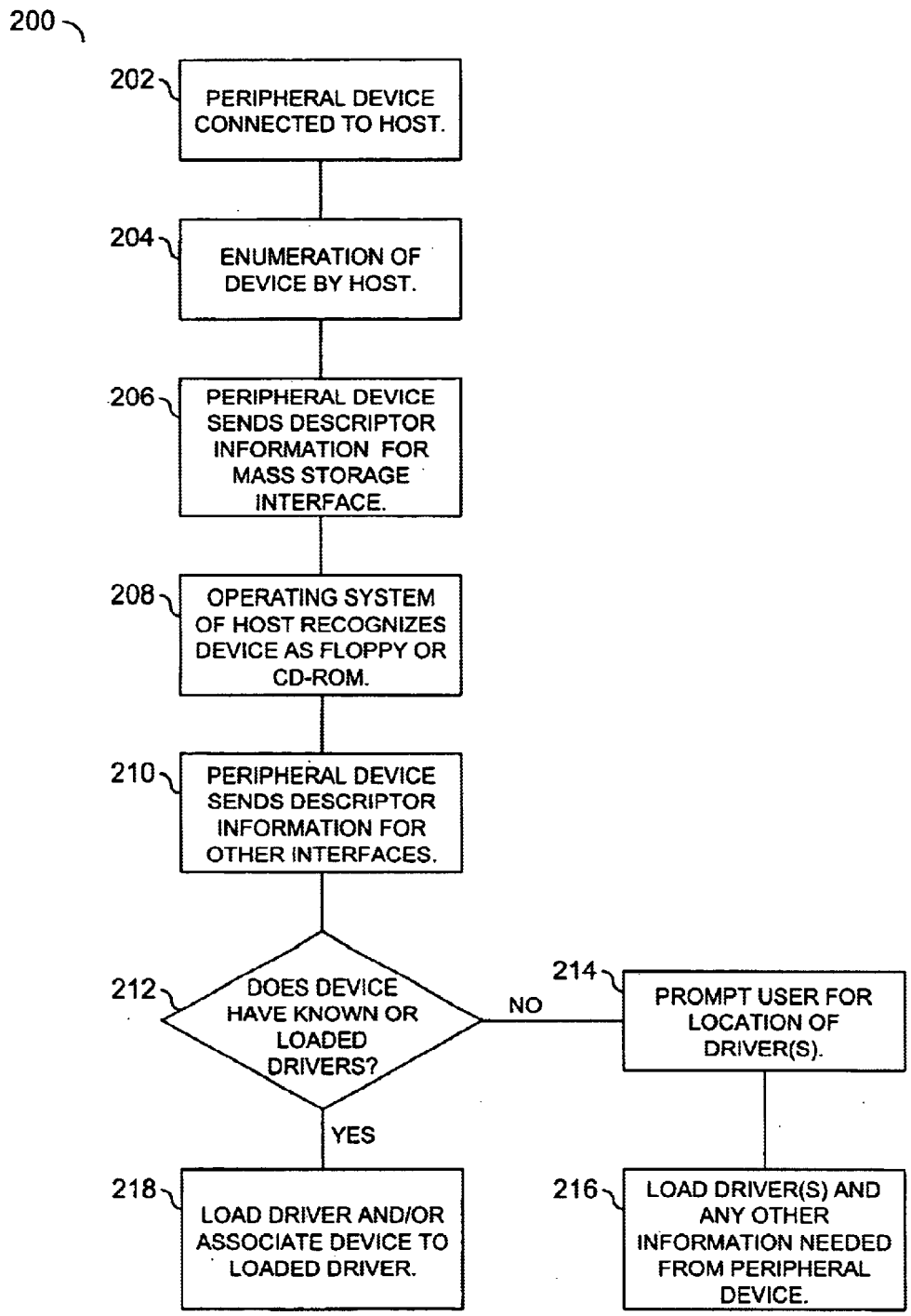
FIG. 4 is a flow diagram of an example operation of the present invention.

Referring to FIG. 4, a flow diagram 200 illustrating an example operation in accordance with a preferred embodiment of the present invention is shown. When the device 100 is first attached to the host 102 (e.g., the block 202), the host 102 generally requests enumeration of the device 100 (e.g., the block 204). The device 100 generally sends descriptor information for a USB mass storage interface (e.g., the block 206). The operating system 118 generally recognizes the device 100 as having a floppy drive, CD-ROM, removable drive, etc. (e.g., the block 208). The device 100 may send descriptor information for the other interfaces 108a–108n (e.g., the block 210). The operating system 118 of the host 102 may determine whether the device 100 is a new device for which a device driver has not already been loaded (e.g., the block 212).

When the operating system 118 determines that a custom driver is needed, the operating system 118 may prompt the user to identify a location of the device driver for the device 100 (e.g., the block 214). Instead of inserting and directing the operating system to a file stored on a CD-ROM or floppy disk, the user may simply direct the operating system 118 to a file stored on the "virtual" disk drive implemented within the device 100 by the mass storage interface 106. The operating system 118 may copy the driver files from the device 100 and load the device driver files (e.g., the block 216).

In general, the operating system 118 (e.g., Windows) may only search default driver directories for drivers for or an INF file providing a link to a driver for a newly attached device. However, when the operating system 118 is configured to automatically search for drivers or an INF file in the root directory of all drives, the drivers located in the root directory of the "virtual" drive on the device 100 may be automatically loaded without user intervention. As an alternative, a driver may be added to the operating system 118 that may be configured to recognize peripheral devices containing device drivers and files. When such a peripheral is recognized, the operating system 118 may be configured to silently load the driver and/or files (e.g., without asking the user to identify a driver location).

In an alternative implementation, the device 100 may be configured to enumerate the mass storage device interface 106 when initially connected to the host 102, and remove the mass storage device interface 106 once the device driver and/or associated files are loaded. In one example, the device 100 may accomplish removal of the mass storage device interface 106 by electronically simulating a disconnection and re-connection to the host 102. An example of how a disconnection and reconnection may be simulated may be found in the U.S. Pat. No. 6,012,103, which is hereby incorporated by reference in its entirety. Removal of the mass storage device interface 106 may conserve space in systems with a large number of drives.

In yet another implementation, the device 100 may be configured to determine whether to enable the mass storage device interface 106 based on behavior of the host 102 during enumeration. For example, the host 102 may behave differently during enumeration when the device driver for the device 100 is already present than when the device driver is not yet present. The device 100 may be configured to detect that the driver is not present and enable the mass storage device interface 106.

Multiple device drivers for multiple operating systems may be supplied on the device 100. For example, the files or the directories contained on the virtual disk drive may be named in a manner that indicates to the user which should be used in a particular installation. Other files (e.g., program files, data files, etc.) relating to the peripheral device 100 may be distributed similarly. For example, the files may be installed by the user separately from driver installation or automatically during the driver installation. The device drivers and other files stored on the device 100 may be field upgradable (e.g., software improvements may be incorporated into the device 100).

When the drivers are for operating systems that support automatic extraction of compressed drivers, the amount of local non-volatile (NV) storage used may be minimized by storing the drivers in a compressed form (e.g., the Windows "cab" file format). In some cases the use of compression may reduce the storage area used to a level where inexpensive serial EEPROMs may be used to store the driver.

Alternatively, the processor 114 may be configured to perform the decompression operation. When the processor 114 is configured to perform the decompression operation, the amount of NV storage may be minimized for all operating systems regardless of whether the operating systems support driver installation from compressed files.

Incorporating non-volatile storage sufficient to contain a device driver within a peripheral that does not already have significant quantities of such storage may not be cost effective. However, in applications where cost is not the overriding factor, the size, ease of use and inventory reduction advantages of the present invention may justify the cost of adding the non-volatile storage. Increasing numbers of USB peripherals already have large quantities of non-volatile storage (e.g., in the form of EPROM or FLASH memory). In some cases, because such memory may be available only in standard sizes, there may be unused memory available to implement the present invention with no additional cost. Alternatively, when the marginal cost of increasing the size of an existing bank of memory is modest, implementing the present invention in devices without sufficient spare storage capacity may be cost effective.

The host 102 from time to time may need a driver upgrade. For example, a network add-in card that stops working when the operating system is upgraded may simply need a new driver for the new operating system. The drivers may be available on the vendor's website for free download. In another example, video card drivers may be frequently upgraded to improve performance. Again, the vendor may post the drivers on a website. In general, the drivers may be downloaded to the hard drive of the host and an install program may be run to add the new driver the operating system.

In the case of the peripheral device 100 that contains its own drivers, the drivers are generally loaded into the peripheral device during manufacturing. When a new version of an operating system is released (e.g., Windows XP), the peripheral may not operate on a host with the new operating system. When such an event occurs, the drivers on the device 100 may be manually updated. For example, the peripheral device 100 may be connected to a system (host) that uses a supported operating system and the supported operating system used to re-program the computer readable media in the peripheral device 100 with an updated driver and/or other files. For example, the driver and files may be downloaded from the vendor website and stored on the virtual drive of the peripheral device 100. When the peripheral device 100 is updated, the peripheral device 100 may be connected to the computer with the new operating system.

Alternatively, the peripheral device 100 may be upgraded automatically. For example, when the operating system of a host is upgraded, the upgrading process may include automatically upgrading any peripherals that are connected to the host by accessing, in one example, vendor websites. By upgrading the information on the peripheral device 100, the latest driver may be available wherever the peripheral device 100 is used.

Figure 5:
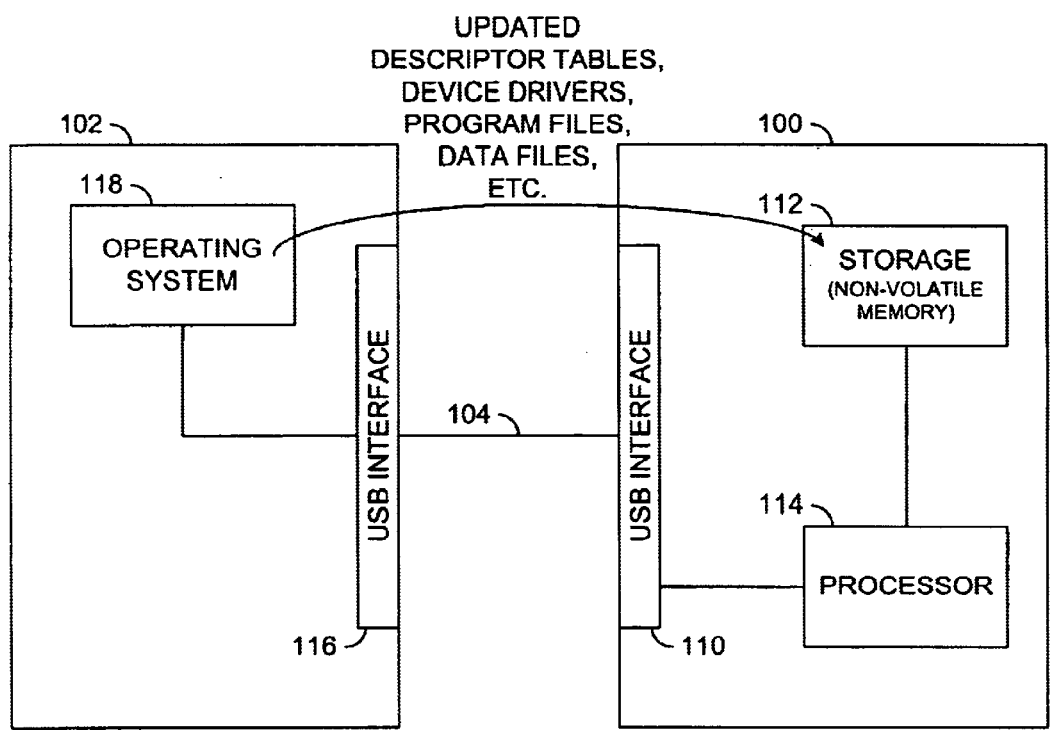
FIG. 5 is a detailed block diagram illustrating an example programming operation of a preferred embodiment of the present invention.

Referring to FIG. 5, a block diagram of the device 100 is shown illustrating an update (upgrade) operation. The device 100 is shown receiving updated files (e.g., descriptor tables, device drivers, program files, data files, etc.) from the host 102. The updated files may be supplied, in one example, with updates for the operating system. Alternatively, the updated files may be obtained from a website for the vendor of the peripheral device 100.

Figure 6:
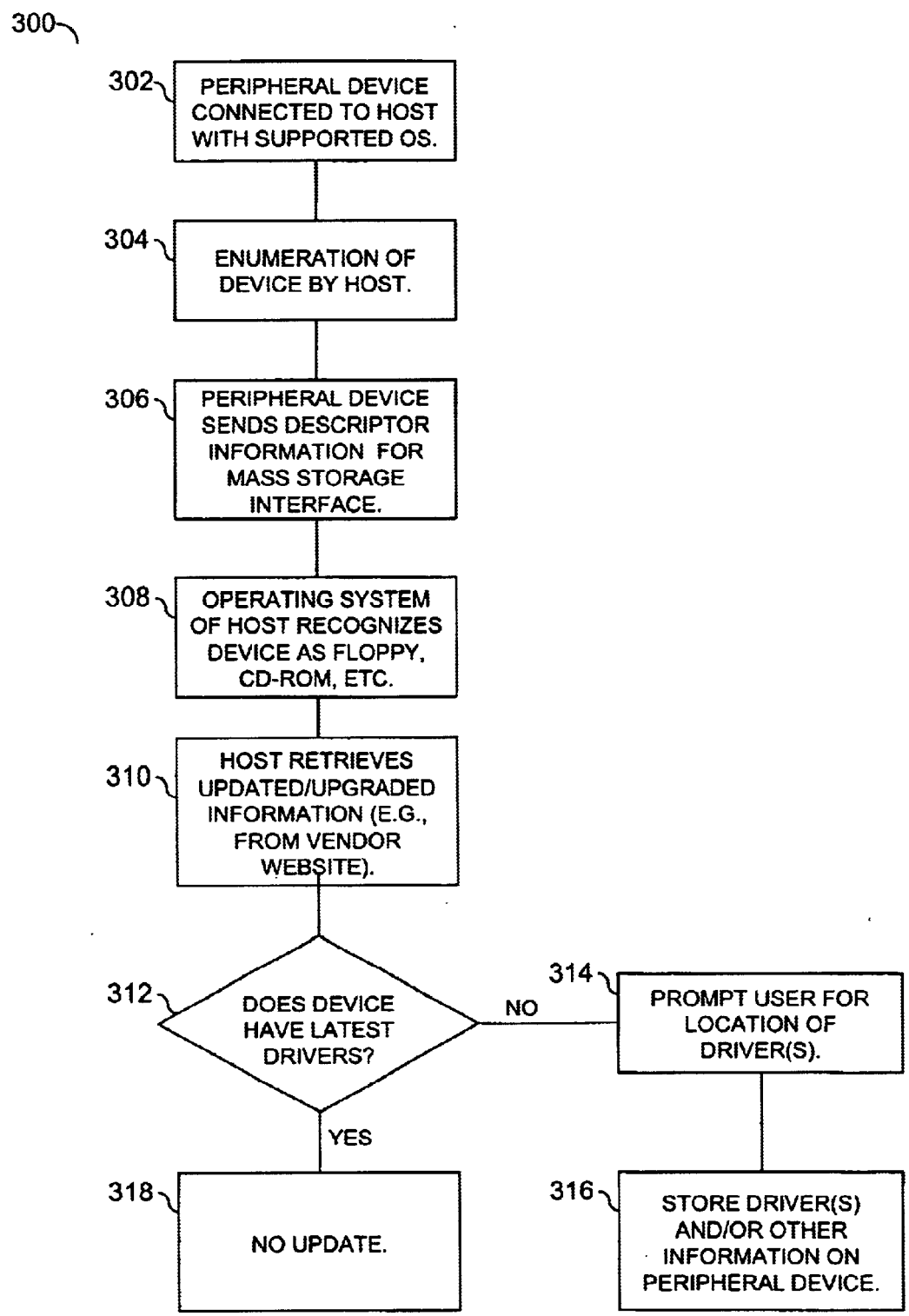
FIG. 6 is a flow diagram of the example programming operation of FIG. 5.

Referring to FIG. 6, a flow diagram 300 illustrating an example upgrade operation in accordance with a preferred embodiment of the present invention is shown. When the device 100 is first attached to the host 102 with a supported operating system (e.g., the block 302), the host 102 generally requests enumeration of the device (e.g., the block 304). The device 100 generally sends descriptor information for a USB mass storage interface (e.g., the block 306). The operating system 118 generally recognizes the device 100 as having a floppy drive, CD-ROM, removable drive, etc. (e.g., the block 308). The host 102 may then be used to retrieve update and/or upgrade information from, in one example, a vendor website (e.g., the block 310). The operating system 118 of the host may determine whether the latest drivers for the device 100 have already been loaded (e.g., the block 312).

When the operating system 118 determines that a driver update is available, the operating system 118 may prompt the user to identify a location of the device driver for the device 100 (e.g., the block 314). The user may simply direct the operating system 118 to store the update on the "virtual" disk drive implemented within the device 100 via the mass storage interface. The operating system 118 may copy the driver files and any other files to the computer readable media within the device 100 (e.g., the block 316). When the operating system 118 determines that a driver update is not available, the contents of the computer readable media within the device 100 are generally left unchanged (e.g., the block 318).

The present invention may provide for (i) incorporation of device drivers in a USB peripheral device, rather than being separately contained in the operating system or on separate media supplied with the device, (ii) distribution of the device driver for a peripheral device using the USB peripheral device as the medium, (iii) distribution of program and/or data files associated with a USB peripheral device in the peripheral device itself, and/or (iv) field upgrade of device drivers and files stored on a USB peripheral device.

While the invention has been particularly shown and described with reference to the preferred embodiments thereof, it will be understood by those skilled in the art that various changes in form and details may be made without departing from the spirit and scope of the invention.

What is claimed is:

1. A peripheral device comprising:
   a computer readable media containing instructions for operating said peripheral device; and
   an interface circuit configured to (i) couple said peripheral to a computer and (ii) communicate said instructions to an operating system of said computer, wherein said peripheral is configured to enumerate as a mass storage device and at least one other type of peripheral device in response to connection of said peripheral device to said computer.

2. The peripheral device according to claim 1, wherein said instructions comprise one or more device drivers for said at least one other type of peripheral device.

3. The peripheral device according to claim 2, wherein said one or more device drivers operate with one or more operating systems.

4. The peripheral device according to claim 1, wherein said computer readable media comprises a non-volatile memory device.

5. The peripheral device according to claim 1, wherein said instructions further comprise program files and/or data files.

6. The peripheral device according to claim 1, wherein said peripheral device comprises a peripheral device compliant with a Universal Serial Bus Specification.

7. The peripheral device according to claim 1, wherein said interface circuit is configured to support a standard mass storage device driver of said operating system.

8. The peripheral device according to claim 1, wherein said interface circuit is configured to communicate descriptor information for said mass storage device and said at least one other peripheral device in response to an enumeration request.

9. The peripheral device according to claim 1, wherein said interface circuit is configured to communicate descriptor information for a mass storage device interface prior to descriptor information for said at least one other peripheral device in response to connection of said peripheral device to said computer.

10. The peripheral device according to claim 1, wherein said instructions are automatically communicated to said operating system in response to said peripheral device being connected to said computer.

11. The peripheral device according to claim 1, wherein said information is stored in a compressed format.

12. The peripheral device according to claim 1, wherein updated instructions for operating said peripheral device are stored in said computer readable media in response to information received from said computer.

13. A peripheral device comprising:
   means for storing instructions for operating said peripheral device; and
   means for (i) coupling said peripheral to a computer and (ii) communicating said instructions to an operating system of said computer, wherein said peripheral is configured to enumerate as a mass storage device and at least one other type of peripheral device in response to connection of said peripheral device to said computer.

14. A method for delivering a device driver of a peripheral device directly from the peripheral device comprising the steps of:
   (A) storing instructions for operating the peripheral device on a computer readable media within the peripheral device;
   (B) identifying the peripheral device as a mass storage device and at least one other type of peripheral device in response to connection of the peripheral device to a computer;
   (C) presenting an indication of the available instructions for operating the peripheral device; and
   (D) adding a selected set of instructions to an operating system of the computer to which the peripheral device is connected from said computer readable media within the peripheral device.

15. The method according to claim 14, wherein the step (A) comprises a sub-step of:
   compressing said instruction using a data compression scheme.

16. The method according to claim 14, further comprising the step of:
   storing updated instructions on said computer readable media in response to information received from said operating system.

17. The method according to claim 14, wherein the step (B) comprises the sub-step of:

sending descriptor information for mass storage device prior to descriptor information for said at least one other type of peripheral device in response to an initial enumeration request.

18. The method according to claim 14, wherein the step (C) comprises the sub-step of:

presenting one or more device drivers for one or more operating systems stored on said computer readable media as files and or folders on said mass storage device.

19. The method according to claim 18, further comprising the step of:

removing a mass storage device interface of said peripheral device once the device drivers are loaded in said operating system.

20. The method according to claim 21, wherein removing said mass storage device interface comprises:

electronically simulating a disconnection and reconnection of said peripheral device with said computer.

21. The method according to claim 14, wherein the step (D) comprises the sub-step of:

transferring selected information from said computer readable media within said peripheral to said operating system in a compressed format.

22. The method according to claim 14, wherein the step (D) comprises the sub-step of:

decompressing selected information from said computer readable media within said peripheral; and communicating the decompressed information to said operating system.

23. The method according to claim 14, further comprising the steps of:

determining whether to enumerate said peripheral device as said mass storage device based on behavior of said computer during enumeration.

* * * * *